UNITED STATES PATENT OFFICE 2,480,578

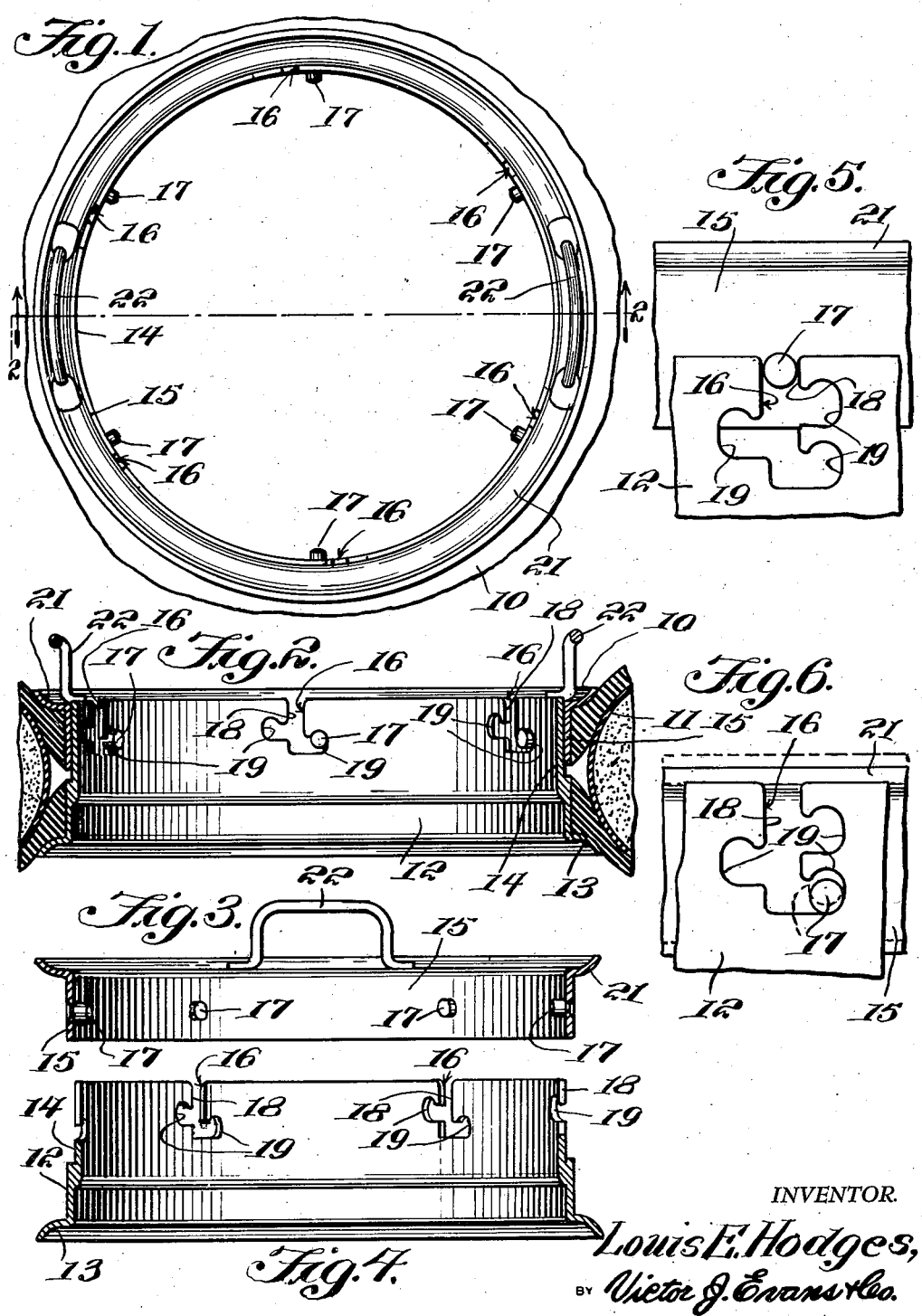

ADJUSTABLE CURING RIM FOR TIRE RECAPPING

Louis E. Hodges, Winston-Salem, N. C.

Application February 3, 1947, Serial No. 726,076

3 Claims. (Cl. 18—18)

This invention relates to an adjustable curing rim for use with tires which are being recapped.

It is an object of the present invention to procide a curing rim which can be adjusted so as to be adapted for several different sizes of tires which are to be recapped and to provide on an adjustable curing rim handles by which the adjustable part can be lifted when repositioning it upon the main part for a different size tire.

Other objects of the present invention are to provide an adjustable curing rim for recapping tires which are of simple construction, inexpensive to manufacture, and efficient in operation.

For other objects and a better understanding of the invention, reference may be had to the following detailed description taken in connection with the accompanying drawing, in which Fig. 1 is a top plan view of the adjustable curing rim positioned within a tire to be recapped, Fig. 2 is a cross-sectional view taken on line 2—2 of Fig. 1 and looking in the direction of the arrows thereof, Fig. 3 is a cross-sectional view of the adjustable part of the rim and taken at an angle such as to look in full upon one of the handles, Fig. 4 is a cross-sectional view of the main part of the rim, Fig. 5 is an enlarged fragmentary elevational view looking upon a modified form of pin and slot arrangement of the rim with the adjustable part positioned free of the main part, Fig. 6 is a similar view to Fig. 5 where the parts have been coupled together in locked positions and set to receive a tire of the minimum dimension.

Referring now to the figures, 10 represents a tire to be recapped and which contains an inner tube or sand bag 11. The internal clinching portions of the tire are dropped over a main part 12 of my adjustable curing rim construction and are rested upon a bottom peripheral flange 13 thereof. The part 12 has a radially inwardly offset portion 14 adapted to overlap an adjustable part 15 of my construction. This offset part 14 has at circumferentially spaced locations, adjusting slots 16 adapted to receive pin projections 17 extending inwardly from the inner face of the part 15. These slots 16 are of the bayonet type comprising a vertically extending portion 18 and a plurality of circumferentially extending locking portions 19 extending from different levels from the vertically extending portion 18. When the pin projections 17 are in any of these locking portions 19, the adjusting part 15 is locked to the part 12 against axial displacement therefrom.

The adjusting part 15 has a peripheral flange 21 which engages with one of the clinching portions of the tire 10. On the top of the adjustable part 15 are handles 22 by which the adjustable part 15 can be lifted and adjusted relative to the part 12.

It will be apparent that the flanges 13 and 21 can be separated at different distances apart whereby to adapt the curing rim to different size tires. It should further be apparent that by having separable parts that not only can the same be adjusted for different size tires but it is easier to mount and remove tires from the rim. Any number of slot and pin arrangements may be had throughout the circumferential extent of the rim.

Having now described my invention, I claim:

1. An adjustable curing rim for use in recapping tires which comprises a main part having a flange adapted to be engaged by one of the clinching portions of the tire and a radially inwardly offset portion having vertically extending slots with locking slots extending laterally and at opposite sides therefrom at different levels, and an adjusting part having a flange adapted to engage the other of the clinching portions of the tire and having pin projections adapted to be positioned in any of the locking slots to retain the adjusting part upon the main part.

2. An adjustable curing rim for use in recapping tires comprising telescoping parts having respectively flanges adapted to be engaged by the respective clinching portions of an automobile tire, one of said parts having a plurality of slots circumferentially spaced therearound, and each of said slots including an open ended vertically extending portion and lateral portions extending and at opposite sides therefrom at different levels, and the other of the parts having pin projections adapted to cooperate with the slot portions whereby the other part can be locked to the one part at different levels so as to accommodate the curing rim to tires of different sizes.

3. An adjustable curing rim for use in recapping tires as defined in claim 2 and handles upon one of the parts to facilitate the axial adjustment of that part relative to the other part.

LOUIS E. HODGES.

REFERENCES CITED

The following references are of record in the file of this patent:

UNITED STATES PATENTS

| Number | Name | Date |
|---|---|---|
| 1,205,161 | Chaney | Nov. 21, 1916 |
| 2,022,337 | Bowman | Nov. 26, 1935 |
| 2,045,937 | Woock | June 30, 1936 |
| 2,150,650 | Errig | Mar. 14, 1939 |
| 2,259,975 | Hewel | Oct. 21, 1941 |
| 2,295,438 | Vaniman | Sept. 8, 1942 |